US012689745B2

(12) United States Patent
Chen et al.

(10) Patent No.: US 12,689,745 B2
(45) Date of Patent: Jul. 21, 2026

(54) CANDIDATE DERIVATION FOR AFFINE MERGE MODE IN VIDEO CODING

(71) Applicant: BEIJING DAJIA INTERNET INFORMATION TECHNOLOGY CO., LTD., Beijing (CN)

(72) Inventors: Wei Chen, San Diego, CA (US);
Xiaoyu Xiu, San Diego, CA (US);
Yi-Wen Chen, San Diego, CA (US);
Hong-Jheng Jhu, San Diego, CA (US);
Che-Wei Kuo, San Diego, CA (US);
Ning Yan, San Diego, CA (US);
Xianglin Wang, San Diego, CA (US);
Bing Yu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 86 days.

(21) Appl. No.: 18/596,614

(22) Filed: Mar. 5, 2024

(65) Prior Publication Data

US 2024/0214587 A1    Jun. 27, 2024

Related U.S. Application Data

(63) Continuation of application No. PCT/US2022/042654, filed on Sep. 6, 2022.

(60) Provisional application No. 63/241,094, filed on Sep. 6, 2021.

(51) Int. Cl.
| | |
|---|---|
| *H04N 19/176* | (2014.01) |
| *H04N 19/129* | (2014.01) |
| *H04N 19/139* | (2014.01) |

(52) U.S. Cl.
CPC ......... *H04N 19/176* (2014.11); *H04N 19/129* (2014.11); *H04N 19/139* (2014.11)

(58) Field of Classification Search
CPC .................................................. H04N 19/176
USPC ....................................... 375/240.01–240.29
See application file for complete search history.

(56) References Cited

U.S. PATENT DOCUMENTS

| | | | |
|---|---|---|---|
| 10,778,999 B2 * | 9/2020 | Li .......................... | H04N 19/70 |
| 11,212,550 B2 | 12/2021 | Hung et al. | |
| 2005/0058196 A1 * | 3/2005 | Fernandes .............. | H04N 19/40 |
| | | | 375/240.2 |

(Continued)

FOREIGN PATENT DOCUMENTS

| | | |
|---|---|---|
| CN | 110855998 A | 2/2020 |
| JP | 2020523853 A | 8/2020 |
| WO | 2020233600 A1 | 11/2020 |

OTHER PUBLICATIONS

The first JPOA issued in JP Application No. 2024-514503 dated Feb. 18, 2025 with English translation, (39p).

(Continued)

*Primary Examiner* — Leron Beck
(74) *Attorney, Agent, or Firm* — Arch & Lake LLP; Hao Tan; Shen Wang

(57) ABSTRACT

A method of video coding, an apparatus, and a non-transitory computer-readable storage medium thereof are provided. The method includes obtaining one or more affine candidates from a plurality of non-adjacent neighbor blocks that are non-adjacent to a current block. The method may further include obtaining one or more control point motion vectors (CPMVs) for the current block based on the one or more affine candidates.

20 Claims, 10 Drawing Sheets

Obtain one or more affine candidates from a plurality of non-adjacent neighbor blocks that are non-adjacent to a current block          1401

Obtain one or more CPMVs for the current block based on the one or more affine candidates          1402

(56)  References Cited

U.S. PATENT DOCUMENTS

| | | | | |
|---|---|---|---|---|
| 2005/0094852 A1* | 5/2005 | Kumar | H04N 19/527 | |
| | | | 375/E7.114 | |
| 2005/0275727 A1* | 12/2005 | Lai | H04N 23/682 | |
| | | | 348/208.1 | |
| 2007/0297513 A1* | 12/2007 | Biswas | H04N 7/014 | |
| | | | 348/E7.013 | |
| 2009/0201416 A1* | 8/2009 | Yang | H04N 7/01 | |
| | | | 348/E7.003 | |
| 2013/0044809 A1* | 2/2013 | Chong | H04N 19/85 | |
| | | | 375/E7.076 | |
| 2014/0254679 A1* | 9/2014 | Ramasubramonian | | |
| | | | H04N 19/513 | |
| | | | 375/240.15 | |
| 2015/0187256 A1* | 7/2015 | Bloks | G06F 3/1415 | |
| | | | 345/639 | |
| 2016/0286232 A1* | 9/2016 | Li | H04N 19/513 | |
| 2018/0205965 A1* | 7/2018 | Chen | H04N 19/44 | |
| 2018/0241998 A1* | 8/2018 | Chen | H04N 19/109 | |
| 2018/0359483 A1 | 12/2018 | Chen et al. | | |
| 2019/0020895 A1* | 1/2019 | Liu | H04N 19/61 | |
| 2019/0028731 A1* | 1/2019 | Chuang | H04N 19/176 | |
| 2020/0036997 A1 | 1/2020 | Li et al. | | |
| 2020/0099951 A1 | 3/2020 | Hung et al. | | |
| 2020/0221116 A1 | 7/2020 | Chen et al. | | |
| 2020/0288163 A1* | 9/2020 | Poirier | H04N 19/176 | |
| 2021/0021825 A1* | 1/2021 | Zheng | H04N 19/137 | |
| 2021/0058637 A1 | 2/2021 | Zhang et al. | | |
| 2021/0195177 A1* | 6/2021 | Zhang | H04N 19/537 | |
| 2021/0195234 A1* | 6/2021 | Zhang | H04N 19/70 | |
| 2021/0203947 A1* | 7/2021 | He | H04N 19/523 | |
| 2021/0250605 A1 | 8/2021 | Lee | | |
| 2021/0266584 A1 | 8/2021 | Zhang et al. | | |
| 2024/0121399 A1* | 4/2024 | Huang | H04N 19/44 | |
| 2024/0129481 A1* | 4/2024 | Huang | H04N 19/139 | |
| 2024/0129519 A1* | 4/2024 | Chen | H04N 19/513 | |
| 2024/0205449 A1* | 6/2024 | Robert | H04N 19/176 | |

OTHER PUBLICATIONS

Jianle Chen et al., "Algorithm description for Versatile Video Coding and Test Model 10 (VTM 10)", Joint Video Experts Team (JVET) of ITU-T SG 16 WP 3 and ISO/IEC JTC 1/SC 29/WG 11, 19th Meeting, by teleconference, Jun. 22-Jul. 1, 2020, JVET-S2002-v1, (15p).

Yi-Wen Chen et al., "Description of SDR, HDR and 360° video coding technology proposal by Qualcomm and Technicolor—low and high complexity versions," Joint Video Experts Team (JVET) of ITU-T SG 16 WP 3 and ISO/IEC JTC 1/SC 29/WG 11, 10th Meeting, San Diego, US, Apr. 10-20, 2018, JVET-J0021, (21p).

Rickard Sjoberg et al., "Description of SDR and HDR video coding technology proposal by Ericsson and Nokia," Joint Video Experts Team (JVET) of ITU-T SG 16 WP 3 and ISO/IEC JTC 1/SC 29/WG 11, 10th Meeting, San Diego, CA, US, Apr. 10-20, 2018, JVET-J0012-v1, (12p).

The International Search Report issued in Application No. PCT/US2022/042654, dated Dec. 23, 2022, (4p).

Extended European Search Report of EP Application No. 22865654.2 dated Jun. 17, 2025, (12p).

He, Yuwen et al., "Description of Core Experiment 2 (CE2): Sub-block based Motion Prediction", Joint Video Experts Team (JVET) of ITU-T SG 16 WP 3 and ISO/IEC JTC 1/SC 29/WG 11, JVET-L1022-v3, 12th Meeting: Macao, CN Oct. 3-12, 2018, (18p).

\* cited by examiner

Figure 8:
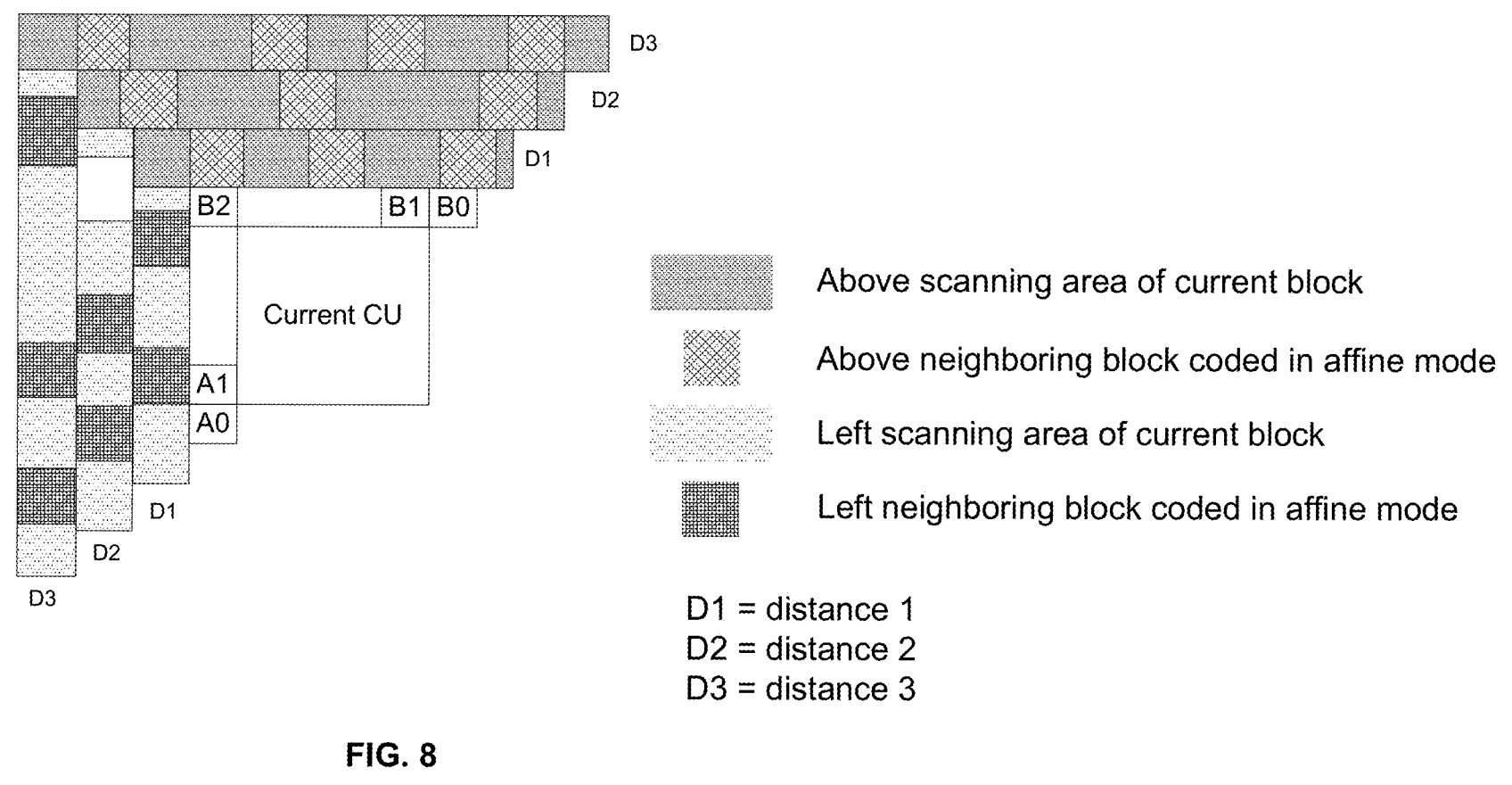

Above scanning area of current block

Above neighboring block coded in affine mode

Left scanning area of current block

Left neighboring block coded in affine mode

D1 = distance 1
D2 = distance 2
D3 = distance 3

·······▷ Translational MV from one non-adjacent neighboring block

——▶ Projected affine CPMV

Current CU

Perpendicular scanning

⌐┘ Adjacent 4x4 motion field

⊠ Non-adjacent 4x4 motion field

——▷ Scanning direction

☐   Adjacent coding block

▨   Non-adjacent coding block

⟶   Scanning direction

☐   Adjacent 4x4 motion field

▨   Non-adjacent 4x4 motion field

⇢   Scanning direction

Calculate a first set of affine model parameters associated with one or more CPMVs of a first affine candidate                                                            1501

Calculate a second set of affine model parameters associated with one or more CPMVs of a second affine candidate                                                          1502

Perform a similarity check between the first affine candidate and the second affine candidate based on the first set of affine model parameters and the second set of affine model parameters                                        1503

FIG. 15

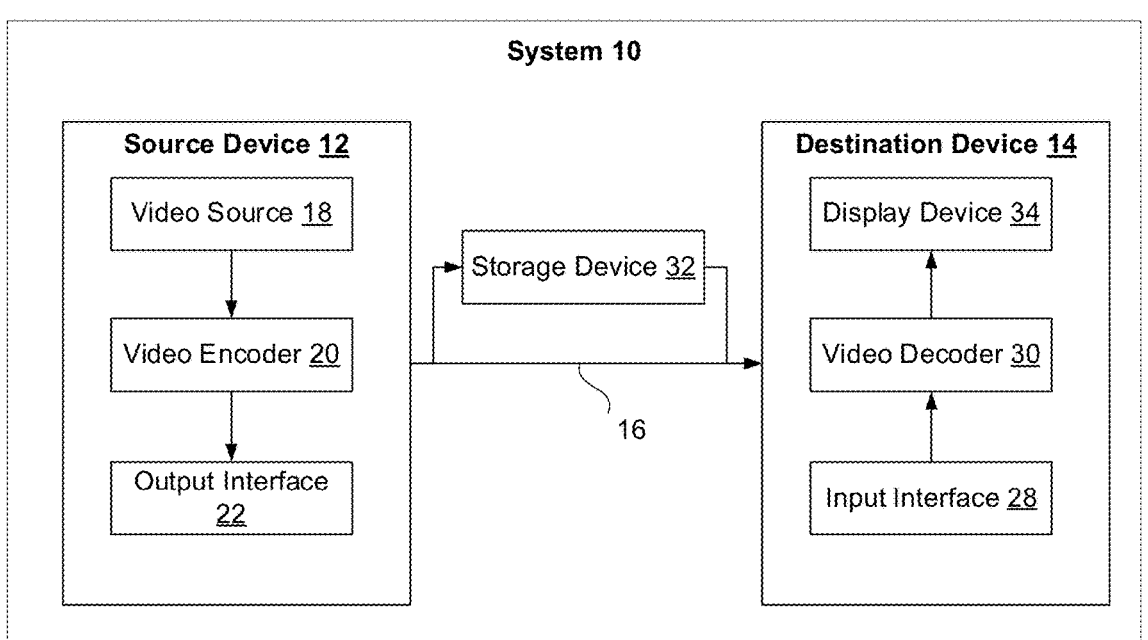

FIG. 16

CANDIDATE DERIVATION FOR AFFINE MERGE MODE IN VIDEO CODING

CROSS-REFERENCE TO RELATED APPLICATION

The present application is a continuation application of International Application No. PCT/US2022/042654, filed on Sep. 6, 2022, which is based on and claims the benefit of U.S. Provisional Application Ser. No. 63/241,094, filed on Sep. 6, 2021, all of which are incorporated herein by reference in their entireties for all purposes.

FIELD

The present disclosure relates to video coding and compression, and in particular but not limited to, methods and apparatus on improving the affine merge candidate derivation for affine motion prediction mode in a video encoding or decoding process.

BACKGROUND

Various video coding techniques may be used to compress video data. Video coding is performed according to one or more video coding standards. For example, nowadays, some well-known video coding standards include Versatile Video Coding (VVC), High Efficiency Video Coding (HEVC, also known as H.265 or MPEG-H Part2) and Advanced Video Coding (AVC, also known as H.264 or MPEG-4 Part 10), which are jointly developed by ISO/IEC MPEG and ITU-T VECG. AOMedia Video 1 (AV1) was developed by Alliance for Open Media (AOM) as a successor to its preceding standard VP9. Audio Video Coding (AVS), which refers to digital audio and digital video compression standard, is another video compression standard series developed by the Audio and Video Coding Standard Workgroup of China. Most of the existing video coding standards are built upon the famous hybrid video coding framework i.e., using block-based prediction methods (e.g., inter-prediction, intra-prediction) to reduce redundancy present in video images or sequences and using transform coding to compact the energy of the prediction errors. An important goal of video coding techniques is to compress video data into a form that uses a lower bit rate while avoiding or minimizing degradations to video quality.

The first generation AVS standard includes Chinese national standard "Information Technology, Advanced Audio Video Coding, Part 2: Video" (known as AVS1) and "Information Technology, Advanced Audio Video Coding Part 16: Radio Television Video" (known as AVS+). It can offer around 50% bit-rate saving at the same perceptual quality compared to MPEG-2 standard. The AVS1 standard video part was promulgated as the Chinese national standard in February 2006. The second generation AVS standard includes the series of Chinese national standard "Information Technology, Efficient Multimedia Coding" (knows as AVS2), which is mainly targeted at the transmission of extra HD TV programs. The coding efficiency of the AVS2 is double of that of the AVS+. In May 2016, the AVS2 was issued as the Chinese national standard. Meanwhile, the AVS2 standard video part was submitted by Institute of Electrical and Electronics Engineers (IEEE) as one international standard for applications. The AVS3 standard is one new generation video coding standard for UHD video application aiming at surpassing the coding efficiency of the latest international standard HEVC. In March 2019, at the 68-th AVS meeting, the AVS3-P2 baseline was finished, which provides approximately 30% bit-rate savings over the HEVC standard. Currently, there is one reference software, called high performance model (HPM), is maintained by the AVS group to demonstrate a reference implementation of the AVS3 standard.

SUMMARY

The present disclosure provides examples of techniques relating to improving the affine merge candidate derivation for affine motion prediction mode in a video encoding or decoding process.

According to a first aspect of the present disclosure, there is provided a method of video coding. The method may include obtaining one or more affine candidates from a plurality of non-adjacent neighbor blocks that are non-adjacent to a current block. Further, the method may include obtaining one or more control point motion vectors (CPMVs) for the current block based on the one or more affine candidates.

According to a second aspect of the present disclosure, there is provided a method for pruning an affine candidate. The method may include calculating a first set of affine model parameters associated with one or more CPMVs of a first affine candidate. Furthermore, the method may include calculating a second set of affine model parameters associated with one or more CPMVs of a second affine candidate. Moreover, the method may include performing a similarity check between the first affine candidate and the second affine candidate based on the first set of affine model parameters and the second set of affine model parameters.

According to a third aspect of the present disclosure, there is provided an apparatus for video coding. The apparatus includes one or more processors and a memory configured to store instructions executable by the one or more processors. Further, the one or more processors, upon execution of the instructions, are configured to perform the method according to the first aspect or the second aspect.

According to a fourth aspect of the present disclosure, there is provided a non-transitory computer-readable storage medium storing computer-executable instructions that, when executed by one or more computer processors, causing the one or more computer processors to perform the method according to the first aspect or the second aspect.

BRIEF DESCRIPTION OF THE DRAWINGS

A more particular description of the examples of the present disclosure will be rendered by reference to specific examples illustrated in the appended drawings. Given that these drawings depict only some examples and are not therefore considered to be limiting in scope, the examples will be described and explained with additional specificity and details through the use of the accompanying drawings.

FIG. 8 illustrates non-adjacent neighboring blocks for inherited affine merge candidates in accordance with some examples of the present disclosure.

FIG. 15 is a flow chart illustrating a method for pruning an affine candidate in accordance with some examples of the present disclosure.

FIG. 16 is a block diagram illustrating a system for encoding and decoding video blocks in accordance with some examples of the present disclosure.

DETAILED DESCRIPTION

Figure 1:
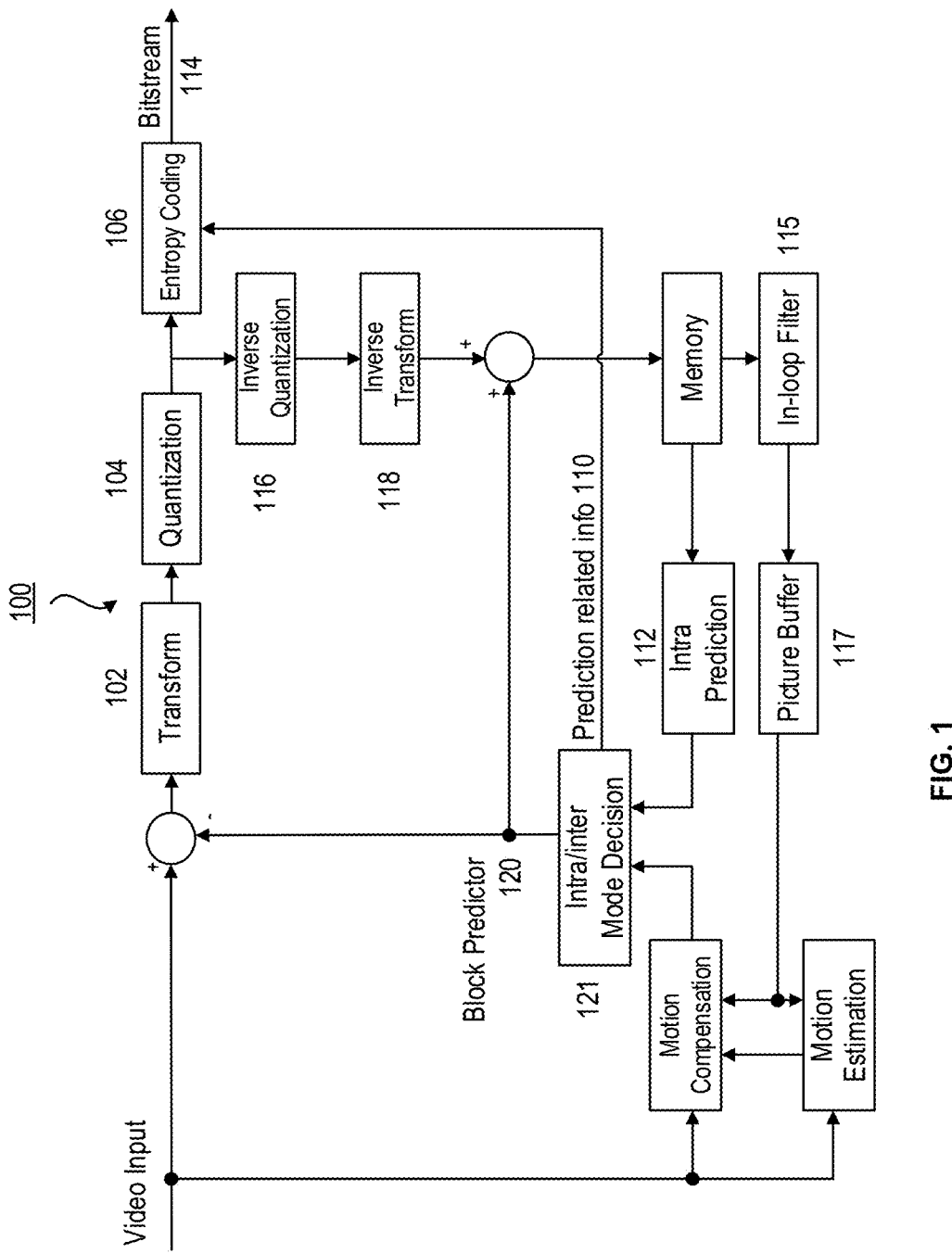
FIG. 1 is a block diagram of an encoder in accordance with some examples of the present disclosure.

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used. For example, it will be apparent to one of ordinary skill in the art that the subject matter presented herein can be implemented on many types of electronic devices with digital video capabilities.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

Throughout the disclosure, the terms "first," "second," "third," etc. are all used as nomenclature only for references to relevant elements, e.g., devices, components, compositions, steps, etc., without implying any spatial or chronological orders, unless expressly specified otherwise. For example, a "first device" and a "second device" may refer to two separately formed devices, or two parts, components, or operational states of a same device, and may be named arbitrarily.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

As used herein, the term "if" or "when" may be understood to mean "upon" or "in response to" depending on the context. These terms, if appear in a claim, may not indicate that the relevant limitations or features are conditional or optional. For example, a method may comprise steps of: i) when or if condition X is present, function or action X' is performed, and ii) when or if condition Y is present, function or action Y' is performed. The method may be implemented with both the capability of performing function or action X', and the capability of performing function or action Y'. Thus, the functions X' and Y' may both be performed, at different times, on multiple executions of the method.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

FIG. 16 is a block diagram illustrating an exemplary system 10 for encoding and decoding video blocks in parallel in accordance with some implementations of the present disclosure. As shown in FIG. 16, the system 10 includes a source device 12 that generates and encodes video data to be decoded at a later time by a destination device 14. The source device 12 and the destination device 14 may comprise any of a wide variety of electronic devices, including desktop or laptop computers, tablet computers, smart phones, set-top boxes, digital televisions, cameras, display devices, digital media players, video gaming consoles, video streaming device, or the like. In some implementations, the source device 12 and the destination device 14 are equipped with wireless communication capabilities.

In some implementations, the destination device 14 may receive the encoded video data to be decoded via a link 16. The link 16 may comprise any type of communication medium or device capable of moving the encoded video data from the source device 12 to the destination device 14. In one example, the link 16 may comprise a communication medium to enable the source device 12 to transmit the encoded video data directly to the destination device 14 in real time. The encoded video data may be modulated according to a communication standard, such as a wireless communication protocol, and transmitted to the destination device 14. The communication medium may comprise any wireless or wired communication medium, such as a Radio Frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

In some other implementations, the encoded video data may be transmitted from an output interface 22 to a storage device 32. Subsequently, the encoded video data in the storage device 32 may be accessed by the destination device 14 via an input interface 28. The storage device 32 may include any of a variety of distributed or locally accessed data storage media such as a hard drive, Blu-ray discs, Digital Versatile Disks (DVDs), Compact Disc Read-Only Memories (CD-ROMs), flash memory, volatile or non-volatile memory, or any other suitable digital storage media for storing the encoded video data. In a further example, the storage device 32 may correspond to a file server or another intermediate storage device that may hold the encoded video data generated by the source device 12. The destination device 14 may access the stored video data from the storage device 32 via streaming or downloading. The file server may be any type of computer capable of storing the encoded video data and transmitting the encoded video data to the destination device 14. Exemplary file servers include a web server (e.g., for a website), a File Transfer Protocol (FTP) server, Network Attached Storage (NAS) devices, or a local disk drive. The destination device 14 may access the encoded video data through any standard data connection, including a wireless channel (e.g., a Wireless Fidelity (Wi-Fi) connection), a wired connection (e.g., Digital Subscriber Line (DSL), cable modem, etc.), or a combination of both that is suitable for accessing encoded video data stored on a file server. The transmission of the encoded video data from the storage device 32 may be a streaming transmission, a download transmission, or a combination of both.

As shown in FIG. 16, the source device 12 includes a video source 18, a video encoder 20 and the output interface 22. The video source 18 may include a source such as a video capturing device, e.g., a video camera, a video archive containing previously captured video, a video feeding interface to receive video from a video content provider, and/or a computer graphics system for generating computer graphics data as the source video, or a combination of such sources. As one example, if the video source 18 is a video camera of a security surveillance system, the source device 12 and the destination device 14 may form camera phones or video phones. However, the implementations described in the present application may be applicable to video coding in general, and may be applied to wireless and/or wired applications.

The captured, pre-captured, or computer-generated video may be encoded by the video encoder 20. The encoded video data may be transmitted directly to the destination device 14 via the output interface 22 of the source device 12. The encoded video data may also (or alternatively) be stored onto the storage device 32 for later access by the destination device 14 or other devices, for decoding and/or playback. The output interface 22 may further include a modem and/or a transmitter.

The destination device 14 includes the input interface 28, a video decoder 30, and a display device 34. The input interface 28 may include a receiver and/or a modem and receive the encoded video data over the link 16. The encoded video data communicated over the link 16, or provided on the storage device 32, may include a variety of syntax elements generated by the video encoder 20 for use by the video decoder 30 in decoding the video data. Such syntax elements may be included within the encoded video data transmitted on a communication medium, stored on a storage medium, or stored on a file server.

In some implementations, the destination device 14 may include the display device 34, which can be an integrated display device and an external display device that is configured to communicate with the destination device 14. The display device 34 displays the decoded video data to a user, and may comprise any of a variety of display devices such as a Liquid Crystal Display (LCD), a plasma display, an Organic Light Emitting Diode (OLED) display, or another type of display device.

The video encoder 20 and the video decoder 30 may operate according to proprietary or industry standards, such as VVC, HEVC, MPEG-4, Part 10, AVC, or extensions of such standards. It should be understood that the present application is not limited to a specific video encoding/decoding standard and may be applicable to other video encoding/decoding standards. It is generally contemplated that the video encoder 20 of the source device 12 may be configured to encode video data according to any of these current or future standards. Similarly, it is also generally contemplated that the video decoder 30 of the destination device 14 may be configured to decode video data according to any of these current or future standards.

The video encoder 20 and the video decoder 30 each may be implemented as any of a variety of suitable encoder and/or decoder circuitry, such as one or more microprocessors, Digital Signal Processors (DSPs), Application Specific Integrated Circuits (ASICs), Field Programmable Gate Arrays (FPGAs), discrete logic, software, hardware, firmware or any combinations thereof. When implemented partially in software, an electronic device may store instructions for the software in a suitable, non-transitory computer-readable medium and execute the instructions in hardware using one or more processors to perform the video encoding/decoding operations disclosed in the present disclosure. Each of the video encoder 20 and the video decoder 30 may be included in one or more encoders or decoders, either of which may be integrated as part of a combined encoder/decoder (CODEC) in a respective device.

Like HEVC, VVC is built upon the block-based hybrid video coding framework. FIG. 1 is a block diagram illustrating a block-based video encoder in accordance with some implementations of the present disclosure. In the encoder 100, the input video signal is processed block by block, called coding units (CUs). The encoder 100 may be the video encoder 20 as shown in FIG. 16. In VTM-1.0, a CU can be up to 128×128 pixels. However, different from the HEVC which partitions blocks only based on quad-trees, in VVC, one coding tree unit (CTU) is split into CUs to adapt to varying local characteristics based on quad/binary/ternary-tree. Additionally, the concept of multiple partition unit type in the HEVC is removed, i.e., the separation of CU, prediction unit (PU) and transform unit (TU) does not exist in the VVC anymore; instead, each CU is always used as the basic unit for both prediction and transform without further partitions. In the multi-type tree structure, one CTU is firstly partitioned by a quad-tree structure. Then, each quad-tree leaf node can be further partitioned by a binary and ternary tree structure.

FIGS. 3A-3E are schematic diagrams illustrating multi-type tree splitting modes in accordance with some implementations of the present disclosure. FIGS. 3A-3E respectively show five splitting types including quaternary partitioning (FIG. 3A), vertical binary partitioning (FIG.

Figures 3A, 3B, 3C, 3D, 3E, 4A:
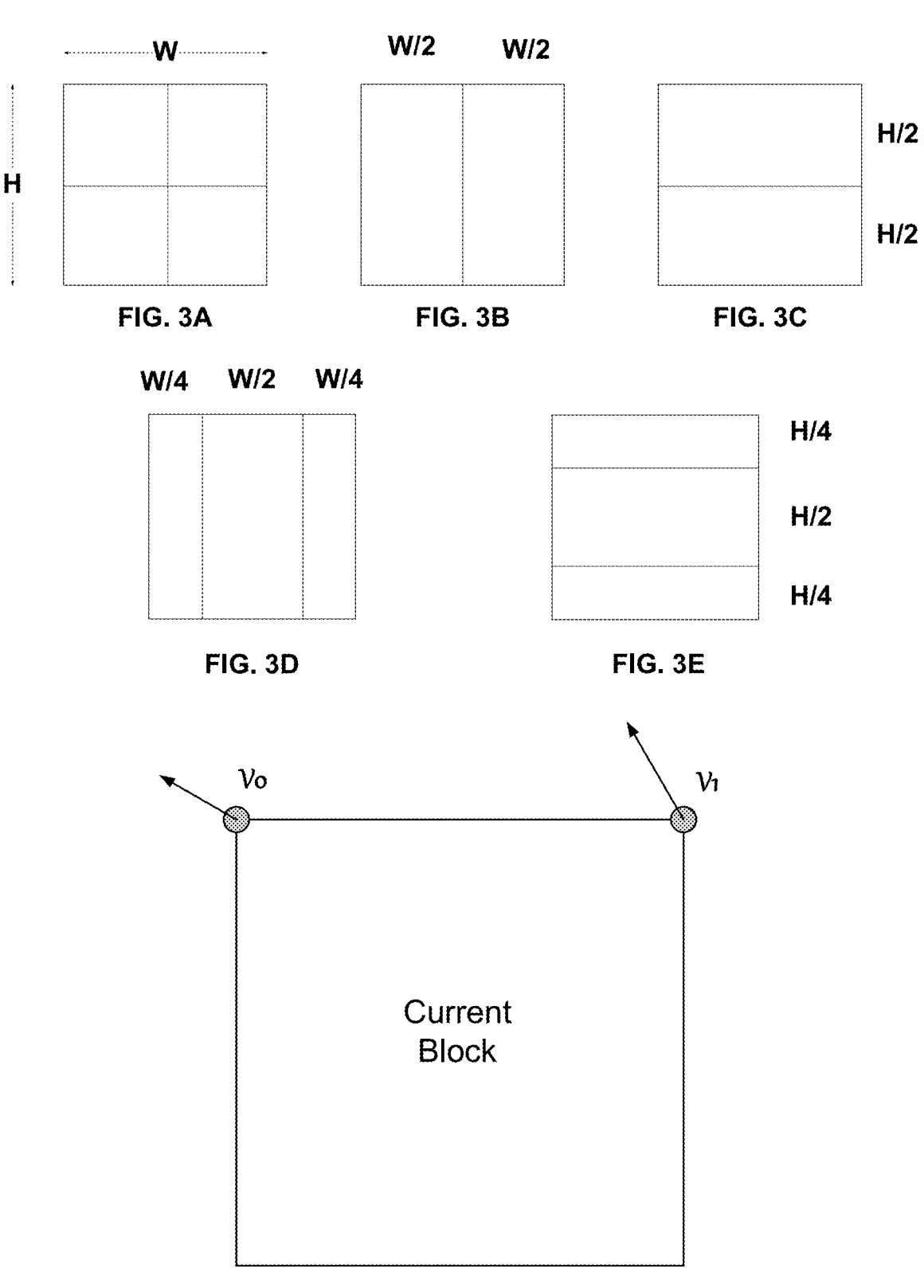
FIG. 3A is a diagram illustrating block partitions in a multi-type tree structure in accordance with some examples of the present disclosure.
FIG. 3B is a diagram illustrating block partitions in a multi-type tree structure in accordance with some examples of the present disclosure.
FIG. 3C is a diagram illustrating block partitions in a multi-type tree structure in accordance with some examples of the present disclosure.
FIG. 3D is a diagram illustrating block partitions in a multi-type tree structure in accordance with some examples of the present disclosure.
FIG. 3E is a diagram illustrating block partitions in a multi-type tree structure in accordance with some examples of the present disclosure.
FIG. 4A illustrates 4-parameter affine model in accordance with some examples of the present disclosure.

3B), horizontal binary partitioning (FIG. 3C), vertical ternary partitioning (FIG. 3D), and horizontal ternary partitioning (FIG. 3E).

For each given video block, spatial prediction and/or temporal prediction may be performed. Spatial prediction (or "intra prediction") uses pixels from the samples of already coded neighboring blocks (which are called reference samples) in the same video picture/slice to predict the current video block. Spatial prediction reduces spatial redundancy inherent in the video signal. Temporal prediction (also referred to as "inter prediction" or "motion compensated prediction") uses reconstructed pixels from the already coded video pictures to predict the current video block. Temporal prediction reduces temporal redundancy inherent in the video signal. Temporal prediction signal for a given CU is usually signaled by one or more motion vectors (MVs) which indicate the amount and the direction of motion between the current CU and its temporal reference. Also, if multiple reference pictures are supported, one reference picture index is additionally sent, which is used to identify from which reference picture in the reference picture store the temporal prediction signal comes.

After spatial and/or temporal prediction, an intra/inter mode decision circuitry 121 in the encoder 100 chooses the best prediction mode, for example based on the rate-distortion optimization method. The block predictor 120 is then subtracted from the current video block; and the resulting prediction residual is de-correlated using the transform circuitry 102 and the quantization circuitry 104. The resulting quantized residual coefficients are inverse quantized by the inverse quantization circuitry 116 and inverse transformed by the inverse transform circuitry 118 to form the reconstructed residual, which is then added back to the prediction block to form the reconstructed signal of the CU. Further, in-loop filtering 115, such as a deblocking filter, a sample adaptive offset (SAO), and/or an adaptive in-loop filter (ALF) may be applied on the reconstructed CU before it is put in the reference picture store of the picture buffer 117 and used to code future video blocks. To form the output video bitstream 114, coding mode (inter or intra), prediction mode information, motion information, and quantized residual coefficients are all sent to the entropy coding unit 106 to be further compressed and packed to form the bit-stream.

For example, a deblocking filter is available in AVC, HEVC as well as the now-current version of VVC. In HEVC, an additional in-loop filter called SAO is defined to further improve coding efficiency. In the now-current version of the VVC standard, yet another in-loop filter called ALF is being actively investigated, and it has a good chance of being included in the final standard.

These in-loop filter operations are optional. Performing these operations helps to improve coding efficiency and visual quality. They may also be turned off as a decision rendered by the encoder 100 to save computational complexity.

It should be noted that intra prediction is usually based on unfiltered reconstructed pixels, while inter prediction is based on filtered reconstructed pixels if these filter options are turned on by the encoder 100.

Figure 2:
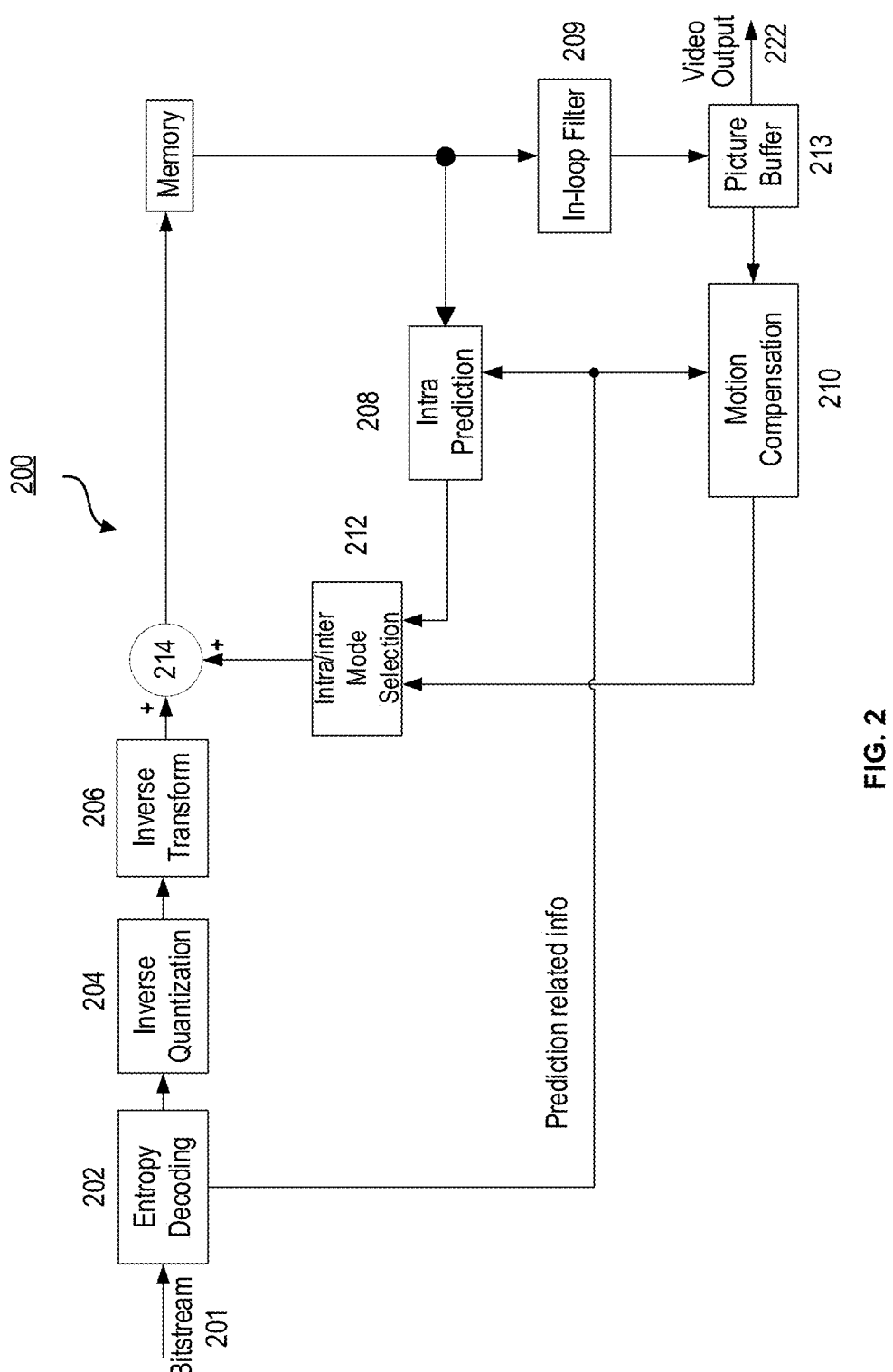
FIG. 2 is a block diagram of a decoder in accordance with some examples of the present disclosure.

FIG. 2 is a block diagram illustrating a block-based video decoder 200 which may be used in conjunction with many video coding standards. This decoder 200 is similar to the reconstruction-related section residing in the encoder 100 of FIG. 1. The block-based video decoder 200 may be the video decoder 30 as shown in FIG. 16. In the decoder 200, an incoming video bitstream 201 is first decoded through an Entropy Decoding 202 to derive quantized coefficient levels and prediction-related information. The quantized coefficient levels are then processed through an Inverse Quantization 204 and an Inverse Transform 206 to obtain a reconstructed prediction residual. A block predictor mechanism, implemented in an Intra/inter Mode Selection 212, is configured to perform either an Intra Prediction 208, or a Motion Compensation 210, based on decoded prediction information. A set of unfiltered reconstructed pixels are obtained by summing up the reconstructed prediction residual from the Inverse Transform 206 and a predictive output generated by the block predictor mechanism, using a summer 214.

The reconstructed block may further go through an In-Loop Filter 209 before it is stored in a Picture Buffer 213 which functions as a reference picture store. The reconstructed video in the Picture Buffer 213 may be sent to drive a display device, as well as used to predict future video blocks. In situations where the In-Loop Filter 209 is turned on, a filtering operation is performed on these reconstructed pixels to derive a final reconstructed Video Output 222.

In the current VVC and AVS3 standards, motion information of the current coding block is either copied from spatial or temporal neighboring blocks specified by a merge candidate index or obtained by explicit signaling of motion estimation. The focus of the present disclosure is to improve the accuracy of the motion vectors for affine merge mode by improving the derivation methods of affine merge candidates. To facilitate the description of the present disclosure, the existing affine merge mode design in the VVC standard is used as an example to illustrate the proposed ideas. Please note that though the existing affine mode design in the VVC standard is used as the example throughout the present disclosure, to a person skilled in the art of modern video coding technologies, the proposed technologies can also be applied to a different design of affine motion prediction mode or other coding tools with the same or similar design spirit.

Affine Model

In HEVC, only translation motion model is applied for motion compensated prediction. While in the real world, there are many kinds of motion, e.g., zoom in/out, rotation, perspective motions and other irregular motions. In the VVC and AVS3, affine motion compensated prediction is applied by signaling one flag for each inter coding block to indicate whether the translation motion model or the affine motion model is applied for inter prediction. In the current VVC and AVS3 design, two affine modes, including 4-parameter affine mode and 6-parameter affine mode, are supported for one affine coding block.

Figure 4B:
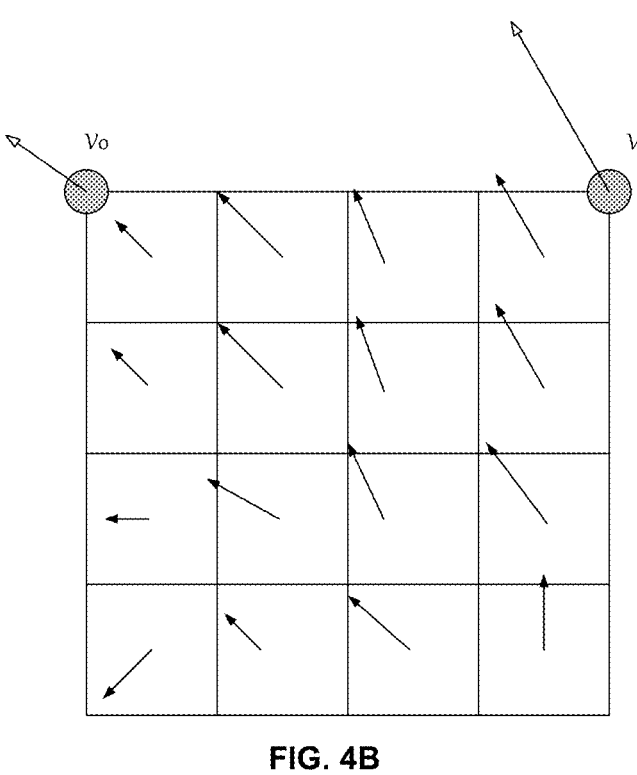
FIG. 4B illustrates 4-parameter affine model in accordance with some examples of the present disclosure.

The 4-parameter affine model has the following parameters: two parameters for translation movement in horizontal and vertical directions respectively, one parameter for zoom motion and one parameter for rotational motion for both directions. In this model, horizontal zoom parameter is equal to vertical zoom parameter, and horizontal rotation parameter is equal to vertical rotation parameter. To achieve a better accommodation of the motion vectors and affine parameter, those affine parameters are to be derived from two MVs (which are also called control point motion vector (CPMV)) located at the top-left corner and top-right corner of a current block. As shown in FIGS. 4A-4B, the affine motion field of the block is described by two CPMVs ($V_0$, $V_1$). Based on the control point motion, the motion field ($v_x$, $v_y$) of one affine coded block is described as

9

$$v_x = \frac{(v_{1x} - v_{0x})}{w}x - \frac{(v_{1y} - v_{0y})}{w}y + v_{0x} \qquad (1)$$

$$v_y = \frac{(v_{1y} - v_{0y})}{w}x + \frac{(v_{1x} - v_{0x})}{w}y + v_{0y}$$

Figure 5:
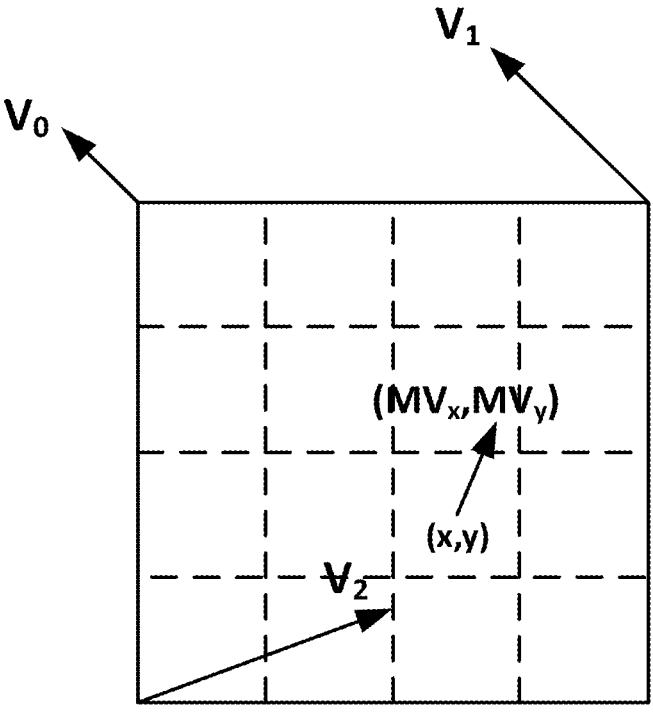
FIG. 5 illustrates 6-parameter affine model in accordance with some examples of the present disclosure.

The 6-parameter affine mode has the following parameters: two parameters for translation movement in horizontal and vertical directions respectively, two parameters for zoom motion and rotation motion respectively in horizontal direction, another two parameters for zoom motion and rotation motion respectively in vertical direction. The 6-parameter affine motion model is coded with three CPMVs. As shown in FIG. 5, the three control points of one 6-paramter affine block are located at the top-left, top-right and bottom left corner of the block. The motion at top-left control point is related to translation motion, and the motion at top-right control point is related to rotation and zoom motion in horizontal direction, and the motion at bottom-left control point is related to rotation and zoom motion in vertical direction. Compared to the 4-parameter affine motion model, the rotation and zoom motion in horizontal direction of the 6-paramter may not be same as those motion in vertical direction. Assuming $(V_0, V_1, V_2)$ are the MVs of the top-left, top-right and bottom-left corners of the current block in FIG. 5, the motion vector of each sub-block $(v_x, v_y)$ is derived using the three MVs at control points as:

$$v_x = v_{0x} + (v_{1x} - v_{0x}) * \frac{x}{w} + (v_{2x} - v_{0x}) * \frac{y}{h} \qquad (2)$$

$$v_y = v_{0y} + (v_{1y} - v_{0y}) * \frac{x}{w} + (v_{2y} - v_{0y}) * \frac{y}{h}$$

Affine Merge Mode

In affine merge mode, the CPMVs for the current block are not explicitly signaled but derived from neighboring blocks. Specifically, in this mode, motion information of spatial neighbor blocks is used to generate CPMVs for the current block. The affine merge mode candidate list has a limited size. For example, in the current VVC design, there may be up to five candidates. The encoder may evaluate and choose the best candidate index based on rate-distortion optimization algorithms. The chosen candidate index is then signaled to the decoder side. The affine merge candidates can be decided in three ways. In the first way, the affine merge candidates may be inherited from neighboring affine coded blocks. In the second way, the affine merge candidates may be constructed from translational MVs from neighboring blocks. In the third way, zero MVs are used as the affine merge candidates.

Figure 6:
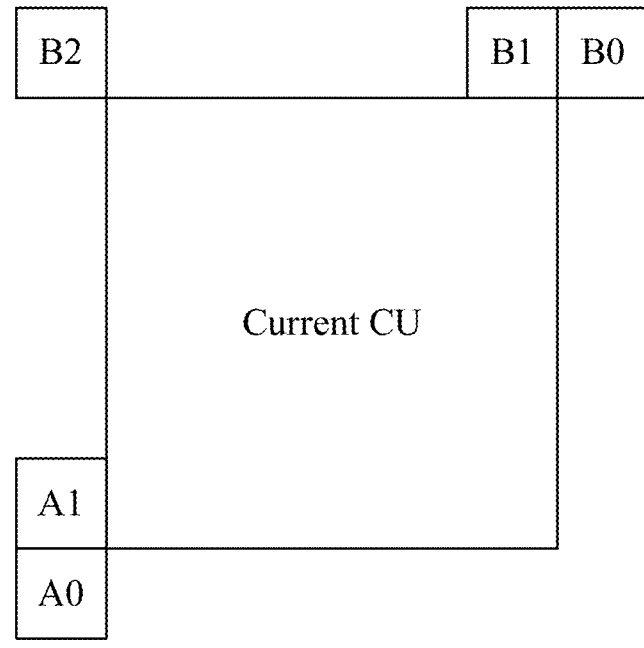
FIG. 6 illustrates adjacent neighboring blocks for inherited affine merge candidates in accordance with some examples of the present disclosure.

For the inherited method, there may be up to two candidates. The candidates are obtained from the neighboring blocks located at the bottom-left of the current block (e.g., scanning order is from A0 to A1 as shown in FIG. 6) and from the neighboring blocks located at the topside of the current block (e.g., scanning order is from B0 to B2 as shown in FIG. 6), if available.

For the constructed method, the candidates are the combinations of neighbor blocks' translational MVs, which may be generated by two steps.

Step 1: obtain four translational MVs including MV1, MV2, MV3 and MV4 from available neighbor blocks.

Figure 7:
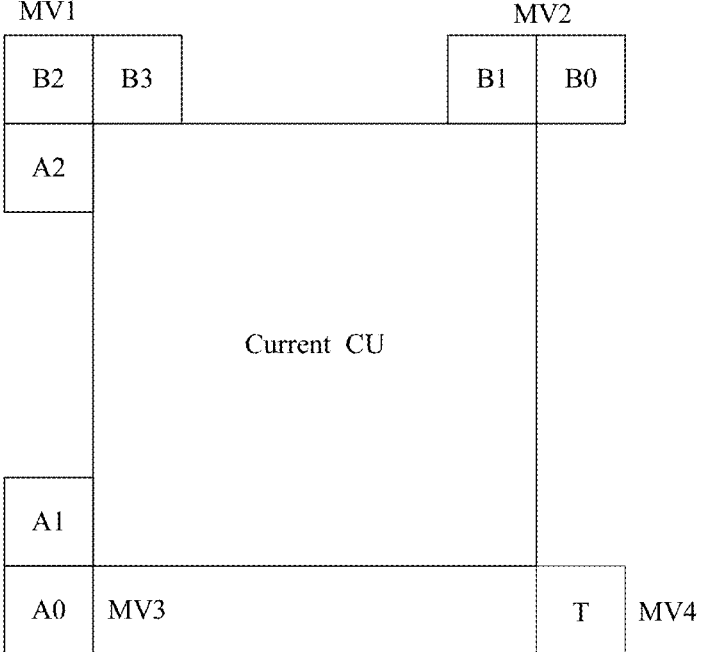
FIG. 7 illustrates adjacent neighboring blocks for constructed affine merge candidates in accordance with some examples of the present disclosure.

MV1: MV from the one of the three neighboring blocks close to the top-left corner of the current block. As shown in FIG. 7, the scanning order is B2, B3 and A2.

MV2: MV from the one of the one from the two neighboring blocks close to the top-right corner of the current block. As shown in FIG. 7, the scanning order is B1 and B0.

MV3: MV from the one of the one from the two neighboring blocks close to the bottom-left corner of the current block. As shown in FIG. 7, the scanning order is A1 and A0.

MV4: MV from the temporally collocated block of the neighboring block close to the bottom-right corner of current block. As shown in the FIG. 7, the neighboring block is T.

Step 2: derive combinations based on the four translational MVs from step 1.

Combination 1: MV1, MV2, MV3;

Combination 2: MV1, MV2, MV4;

Combination 3: MV1, MV3, MV4;

Combination 4: MV2, MV3, MV4;

Combination 5: MV1, MV2;

Combination 6: MV1, MV3.

When the merge candidate list is not full after filling with inherited and constructed candidates, zero MVs are inserted at the end of the list.

For the current video standards VVC and AVS, only adjacent neighboring blocks are used to derive affine merge candidates for the current block, as shown in FIG. 6 and FIG. 7 for inherited candidates and constructed candidates respectively. To increase the diversity of merge candidates and further explore spatial correlations, it is straightforward to extend the coverage of neighboring blocks from adjacent areas to non-adjacent areas.

In the present disclosure, the candidate derivation process for affine merge mode is extended by using not only adjacent neighboring blocks but also non-adjacent neighboring blocks. Detailed methods may be summarized in three aspects including affine merge candidate pruning, non-adjacent neighbor block based derivation process for affine inherited merge candidates and non-adjacent neighbor block based derivation process for affine constructed merge candidates.

Affine Merge Candidate Pruning

As the affine merge candidate list in a typical video coding standards usually has a limited size, candidate pruning is an essential process to remove redundant ones. For both affine merge inherited candidates and constructed candidates, this pruning process is needed. As explained in the introduction section, CPMVs of a current block are not directly used for affine motion compensation. Instead, CPMVs need to be converted into translational MVs at the location of each sub-block within the current block. The conversion process is performed by following a general affine model as shown below:

$$\begin{cases} v_x(x, y) = a + c * x + d * y \\ v_y(x, y) = b + e * x + f * y \end{cases} \qquad (3)$$

where (a, b) are delta translation parameters, (c, d) are delta zoom and rotation parameters for horizontal direction, (e, f) are delta zoom and rotation parameters for vertical direction, (x, y) are the horizontal and vertical distance of the pivot location (e.g., the center or top-left corner) of a sub-block relative to the top-left corner of the current block (e.g., the coordinate (x, y) shown in FIG. 5), and $(v_x, v_y)$ is the target translational MVs of the sub-block.

For 6-parameter affine model, three CPMVs, termed as V0, V1 and V2, are available. Then the six model parameters a, b, c, d, e and f can be calculated as $$\begin{cases} a = v_{0x} \\ b = v_{0y} \\ c = (v_{1x} - v_{0x})/w \\ d = (v_{2x} - v_{0x})/h \\ e = (v_{1y} - v_{0y})/w \\ f = (v_{2y} - v_{0y})/h \end{cases} \quad (4)$$

For 4-parameter affine model, if top-left corner CPMV and top-right corner CPMV, termed as V0 and V1, are available, the six parameters of a, b, c, d, e and f can be calculated as $$\begin{cases} a = v_{0x} \\ b = v_{0y} \\ c = (v_{1x} - v_{0x})/w \\ d = -(v_{1y} - v_{0y})/w \\ e = (v_{1y} - v_{0y})/w \\ f = (v_{1x} - v_{0x})/w \end{cases} \quad (5)$$

For 4-parameter affine model, if top-left corner CPMV and bottom-left corner CPMV, termed as V0 and V2, are available, the six parameters of a, b, c, d, e and f can be calculated as $$\begin{cases} a = v_{0x} \\ b = v_{0y} \\ c = (v_{2y} - v_{0y})/h \\ d = (v_{2x} - v_{0x})/h \\ e = -(v_{2x} - v_{0x})/h \\ f = (v_{2y} - v_{0y})/h \end{cases} \quad (6)$$

When two merge candidate sets of CPMVs are compared for redundancy check, it is proposed to check the similarity of the 6 affine model parameters. Therefore, the candidate pruning process can be performed in two steps.

In Step 1, given two candidate sets of CPMVs, the corresponding affine model parameters for each candidate set are derived. More specifically, the two candidate sets of CPMVs may be represented by two sets of affine model parameters, e.g., $(a_1, b_1, c_1, d_1, e_1, f_1)$ and $(a_2, b_2, c_2, d_2, e_2, f_2)$.

In Step 2, based on one or more pre-defined threshold values, similarity check is performed between the two sets of affine model parameters. In one embodiment, when the absolute values of $(a_1-a_2)$, $(b_1-b_2)$, $(c_1-c_2)$, $(d_1-d_2)$, $(e_1-e_2)$ and $(f_1-f_2)$ are all below a positive threshold value, such as the value of 1, the two candidates are considered to be similar and one of them can be pruned/removed and not put in the merge candidate list.

The benefits of using the converted affine model parameters for candidate redundancy check include that: it creates a unified similarity check process for candidates with different affine model types, e.g., one merge candidate may user 6-parameter affine model with three CPMVs while another candidate may use 4-parameter affine model with two CPMVs; it considers the different impacts of each CPMV in a merge candidate when deriving the target MV at each sub-block; and it provides the similarity significance of two affine merge candidates related to the width and height of the current block.

Non-Adjacent Neighbor Block Based Derivation Process for Affine Inherited Merge Candidates For inherited merge candidates, non-adjacent neighbor block based derivation process may be performed in three steps. Step 1 is for candidate scanning. Step 2 is for CPMV projection. Step 3 is for candidate pruning.

In Step 1, non-adjacent neighboring blocks are scanned and selected by following methods.

Scanning Area and Distance

In some examples, non-adjacent neighboring blocks may be scanned from left area and above area of the current coding block. The scanning distance may be defined as the number of coding blocks from the scanning position to the left side or top side of the current coding blocks.

As shown in FIG. 8, on either the left or above of the current coding block, multiple lines of non-adjacent neighboring blocks may be scanned. The distance shown in FIG. 8 represents the number of coding blocks from each candidate position to the left side or top side of the current block. For example, the area with "distance 2" on the left side of the current block indicates that the candidate neighboring blocks located in this area are 2 blocks away from the current block. Similar indications may be applied to other scanning areas with different distances.

In one or more examples, within each scanning area at a specific distance, the starting and ending neighboring blocks may be position dependent.

In one example, for the left side scanning areas, the starting neighboring blocks may be the adjacent bottom-left block of the starting neighboring block of the adjacent scanning area with smaller distance. For example, as shown in FIG. 8, the starting neighboring block of the "distance 2" scanning area on the left side of the current block is the adjacent bottom-left neighboring block of the starting neighboring block of the "distance 1" scanning area. The ending neighboring blocks may be the adjacent left block of the ending neighboring block of the above scanning area with smaller distance. For example, as shown in FIG. 8, the ending neighboring block of the "distance 2" scanning area on the left side of the current block is the adjacent left neighboring block of the ending neighboring block of the "distance 1" scanning area above the current block.

Similarly, for the above side scanning areas, the starting neighboring blocks may be the adjacent top-right block of the starting neighboring block of the adjacent scanning area with smaller distance. The ending neighboring blocks may be the adjacent top-left block of the ending neighboring block of the adjacent scanning area with smaller distance.

Scanning Order

When the neighboring blocks are scanned in the non-adjacent areas, certain order or/and rules may be followed to determine the selections of the scanned neighboring blocks.

In one example, the left area may be scanned first, and then followed by scanning the above areas. As shown in FIG. 8, three lines of non-adjacent areas (e.g., from distance 1 to distance 3) on the left side may be scanned first, then followed by scanning the three lines of non-adjacent areas above the current block.

In another example, the left areas and above areas may be scanned alternatively. For example, as shown in FIG. 8, the left scanning area with "distance 1" is scanned first, then followed by the scanning the above area with "distance 1."

For scanning areas located on the same side (e.g., left or above areas), the scanning order is from the areas with small distance to the areas with large distance. This order may be flexibly combined with other embodiments of scanning order. For example, the left and above areas may be scanned alternatively, and the order for same side areas is scheduled to be from small distance to large distance.

Within each scanning area at a specific distance, a scanning order may be defined. In one embodiment, for the left scanning areas, the scanning may be started from the bottom neighboring block to the top neighboring block. For the above scanning areas, the scanning may be started from the right block to the left block.

Scanning Termination

For inherited merge candidates, the neighboring blocks coded with affine mode are defined as qualified candidates. In one example, the scanning process may be performed interactively. For example, the scanning performed in a specific area at a specific distance may be stopped at the instance when first X qualified candidates are identified, where X is a predefined positive value. For example, as shown in FIG. 8, the scanning in the left scanning area with distance 1 may be stopped when the first one or more qualified candidates are identified. Then the next iteration of scanning process is started by targeting at another scanning area, which is regulated by a pre-defined scanning order/rule.

In another example, the scanning process may be performed continuously. For example, the scanning performed in a specific area at a specific distance may be stopped at the instance when all covered neighboring blocks are scanned and no more qualified candidates are identified or the maximum allowable number of candidates is reached.

Further, in Step 2, the same process of CPMV projection as used in the current AVS and VVC standards may be utilized. In this CPMV projection process, the current block is assumed to share the same affine model with the selected neighboring block, then two or three corner pixel's coordinates (e.g., if the current block uses 4-parameter model, two coordinates (top-left pixel/sample location and top-right pixel/sample location) are used; if the current block uses 6-parameter model, three coordinates (top-left pixel/sample location, top-right pixel/sample location and bottom-left pixel/sample location) are used) are plugged into equation (1) or (2), which depends on whether the neighboring block is coded with a 4-parameter or 6-parameter affine model, to generate two or three CPMVs.

In step 3, any qualified candidate that is identified in step 1 and converted in step 2 may go through a similarity check against all existing candidates that are already in the merge candidate list. The details of similarity check are already described in the section of Affine Merge Candidate Pruning above. If the newly qualified candidate is found to be similar with any existing candidate in the candidate list, this newly qualified candidate is removed/pruned.

Non-Adjacent Neighbor Block Based Derivation Process for Affine Constructed Merge Candidates In the case of deriving inherited merge candidates, one neighboring block is identified at one time, where this single neighboring block needs to be coded in affine mode and may contain two or three CPMVs. In the case of deriving constructed merge candidates, two or three neighboring blocks may be identified at one time, where each identified neighboring block does not need to be coded in affine mode and only one translational MV is retrieved from this block.

Figure 9:
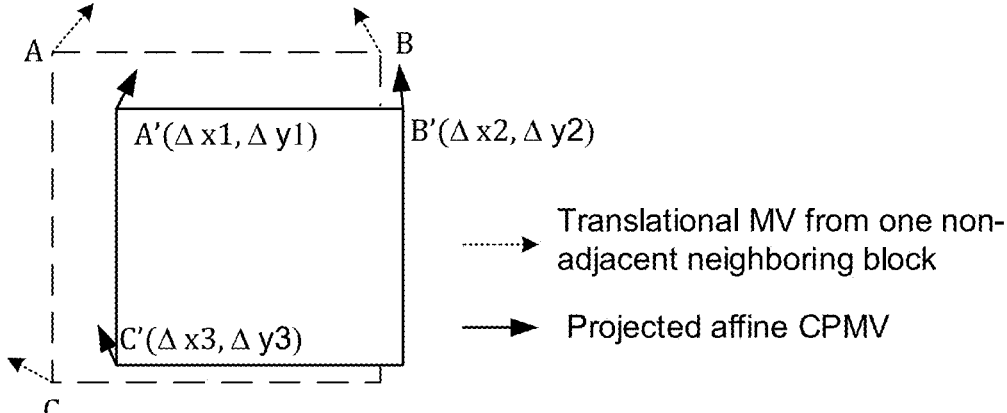
FIG. 9 illustrates derivation of constructed affine merge candidates using non-adjacent neighboring blocks in accordance with some examples of the present disclosure.

FIG. 9 presents an example where constructed affine merge candidates may be derived by using non-adjacent neighboring block. In FIGS. 9, A, B and C are the geographical positions of three non-adjacent neighboring blocks. A virtual coding block is formed by using the position of A as the top-left corner, the position of B as the top-right corner, and the position of C as the bottom-left corner. If considering the virtual CU as an affine coded block, the MVs at the positions of A', B' and C' may be derived by following the equation (3), where the model parameters (a, b, c, d, e, f) may be calculated by the translational MV at the positions of A, B and C. Once derived, the MVs at positions of A', B' and C' may be used as the three CPMVs for the current block, and the existing process (the one used in the AVS and VVC standards) of generating constructed affine merge candidates may be used.

For constructed merge candidates, non-adjacent neighbor block based derivation process may be performed in five steps in an apparatus such as an encoder or a decoder. Step 1 is for candidate scanning. Step 2 is for affine model determination. Step 3 is for CPMV projection. Step 4 is for candidate generation. And Step 5 is for candidate pruning. In step 1, non-adjacent neighboring blocks may be scanned and selected by following methods.

Scanning Area and Distance

In some examples, to maintain a rectangular coding block, the scanning process is only performed for two non-adjacent neighboring blocks. The third non-adjacent neighboring block may be dependent on the horizontal and vertical positions of the first and second non-adjacent neighboring blocks.

In one example, as shown in FIG. 9, the scanning process is only performed for the positions of B and C. The position of A may be uniquely determined by the horizontal position of C and the vertical position of B. In this case, the scanning area and distance may be defined according to a specific scanning direction.

Figure 10:
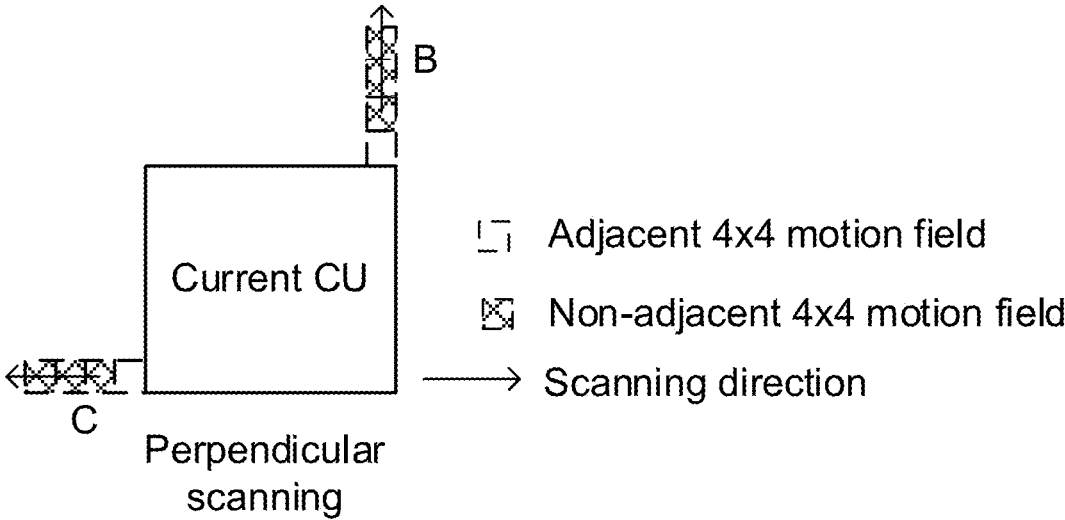
FIG. 10 illustrates perpendicular scanning of non-adjacent neighboring blocks in accordance with some examples of the present disclosure.

In one example, the scanning direction may be perpendicular to the side of the current block. One example is shown in FIG. 10, where the scanning area is defined as one line of continuous motion fields on the left or above the current block. The scanning distance is defined as the number of motion fields from the scanning position to the side of the current block. Note that the size of the motion filed may be dependent on the max granularity of the applicable video coding standards. In the example shown in FIG. 10, the size of the motion field is assumed to be aligned with the current VVC standards and set to be 4×4.

Figure 11:
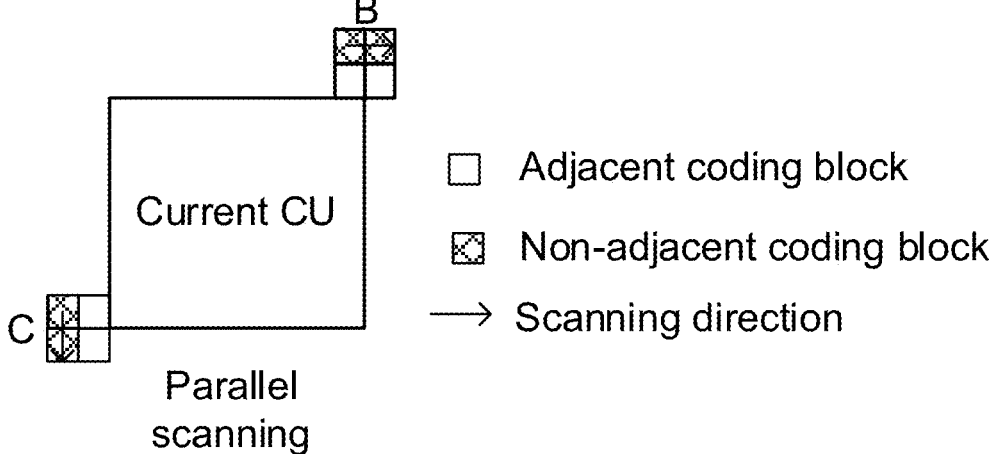
FIG. 11 illustrates parallel scanning of non-adjacent neighboring blocks in accordance with some examples of the present disclosure.

In another example, the scanning direction may be parallel to the side of the current block. One example is shown in FIG. 11, where the scanning area is defined as the one line of continuous coding blocks on the left or above the current block.

Figure 12:
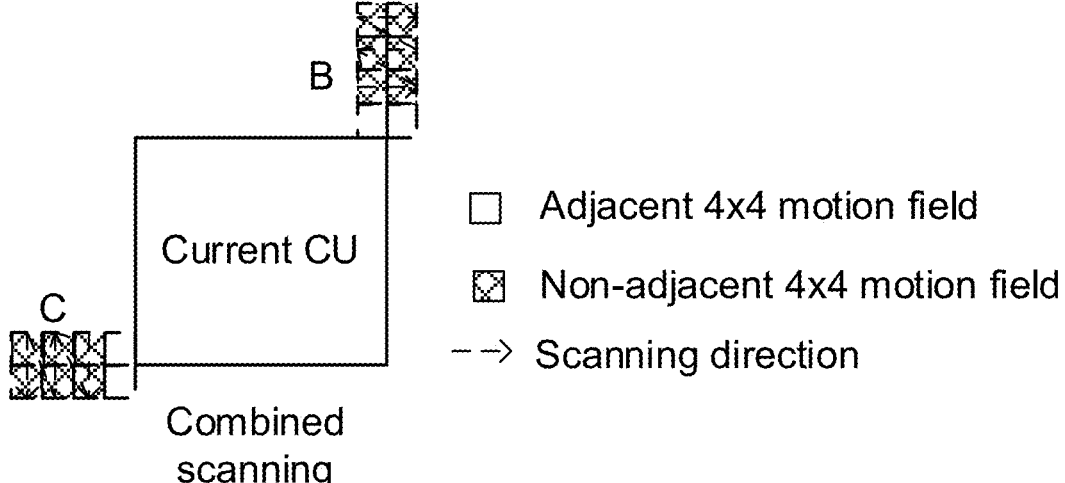
FIG. 12 illustrates combined perpendicular and parallel scanning of non-adjacent neighboring blocks in accordance with some examples of the present disclosure.

In another example, the scanning direction may be a combination of perpendicular and parallel scanning to the side of the current block. One example is shown in FIG. 12. As shown in FIG. 12, the scanning direction may be also a combination of parallel and diagonal. Scanning at position B starts from left to right, and then in a diagonal direction to the left and upper block. The scanning at position B will repeat as shown in FIG. 12. Similarly, scanning at position C starts from top to bottom, and then in a diagonal direction to the left and upper block. The scanning at position C will repeat as shown in FIG. 12.

Scanning Order

In one example, the scanning order may be defined as from the positions with smaller distance to the positions with larger distance to the current coding block. This order may be applied to the case of perpendicular scanning.

In another example, the scanning order may be defined as a fixed pattern. This fix-pattern scanning order may be used for the candidate positions with similar distance. One example is the case of parallel scanning. In one example, the scanning order may be defined as top-down direction for the left scanning area, and may be defined as from left to right directions for the above scanning areas, like the example shown in FIG. 11.

For the case of the combined scanning method, the scanning order may be a combination of fix-pattern and distance dependent, like the example shown in FIG. 12.

Scanning Termination

For constructed merge candidates, the qualified candidate does not need to be affine coded since only translational MV is needed.

Dependent on the required number of candidates, the scanning process may be terminated when the first X qualified candidates are identified, where X is a positive value.

In Step 2, the translational MVs at the positions of the selected candidates after step 1 are evaluated and an appropriate affine model may be determined. For easier illustration and without loss of generality, FIG. 9 is used as an example again.

Due to factors such as hardware constrains, implementation complexity and different reference indexes, the scanning process may be terminated before enough number of candidates are identified. For example, the motion information of the motion field at one or more of the selected candidates after step 1 may be unavailable.

If the motion information of all three candidates are available, the corresponding virtual coding block represents a 6-parameter affine model. If the motion information of one of the three candidates is unavailable, the corresponding virtual coding block represents a 4-parameter affine model. If the motion information of more than one of the three candidates is unavailable, the corresponding virtual coding block may be unable to represent a valid affine model.

In Step 3, if the virtual coding block is able to represent a valid affine model, the same projection process used for inherited merge candidate may be used.

In Step 4, based on the projected CPMVs after Step 3, in one example, the same candidate generation process used in the current VVC or AVS standards may be used. In another embodiment, the temporal motion vectors used in the candidate generation process for the current VVC or AVS standards may be not used for the non-adjacent neighboring blocks based derivation method.

In Step 5, any newly generated candidate after Step 4 may go through a similarity check against all existing candidates that are already in the merge candidate list. The details of similarity check are already described in the section of Affine merge candidate pruning. If the newly generated candidate is found to be similar with any existing candidate in the candidate list, this newly generated candidate is removed or pruned.

Figure 13:
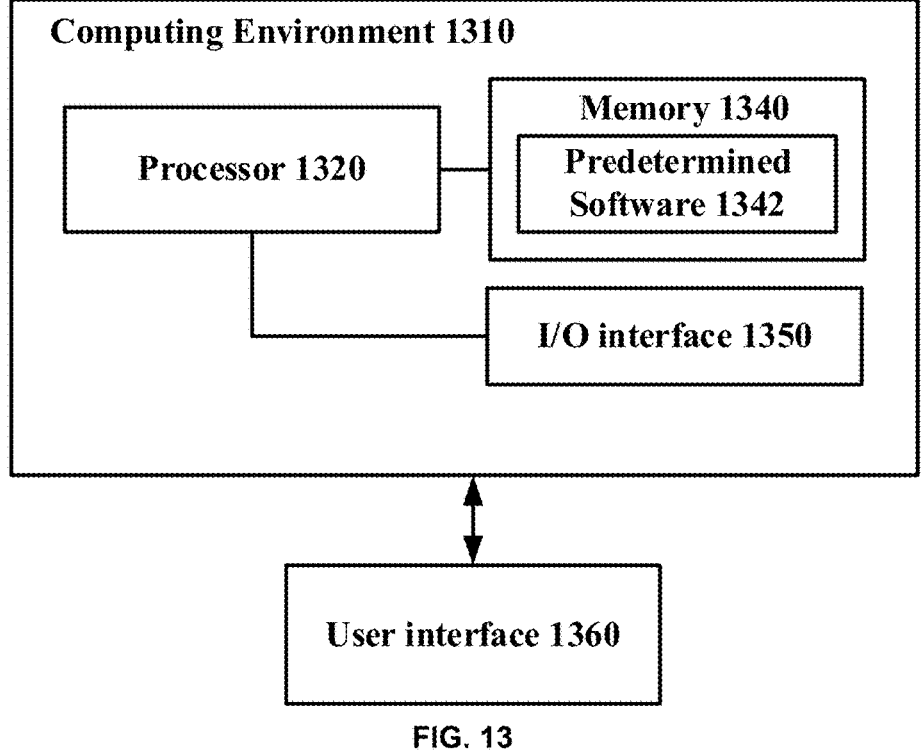
FIG. 13 is a diagram illustrating a computing environment coupled with a user interface in accordance with some examples of the present disclosure.

FIG. 13 shows a computing environment (or a computing device) 1310 coupled with a user interface 1360. The computing environment 1310 can be part of a data processing server. In some embodiments, the computing environment 1310 can perform any of various methods or processes (such as encoding/decoding methods or processes) as described hereinbefore in accordance with various examples of the present disclosure. The computing environment 1310 may include a processor 1320, a memory 1340, and an I/O interface 1350.

The processor 1320 typically controls overall operations of the computing environment 1310, such as the operations associated with the display, data acquisition, data communications, and image processing. The processor 1320 may include one or more processors to execute instructions to perform all or some of the steps in the above-described methods. Moreover, the processor 1320 may include one or more modules that facilitate the interaction between the processor 1320 and other components. The processor may be a Central Processing Unit (CPU), a microprocessor, a single chip machine, a GPU, or the like.

The memory 1340 is configured to store various types of data to support the operation of the computing environment 1310. Memory 1340 may include predetermine software 1342. Examples of such data include instructions for any applications or methods operated on the computing environment 1310, video datasets, image data, etc. The memory 1340 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The I/O interface 1350 provides an interface between the processor 1320 and peripheral interface modules, such as a keyboard, a click wheel, buttons, and the like. The buttons may include but are not limited to, a home button, a start scan button, and a stop scan button. The I/O interface 1350 can be coupled with an encoder and decoder.

In some embodiments, there is also provided a non-transitory computer-readable storage medium including a plurality of programs, such as included in the memory 1340, executable by the processor 1320 in the computing environment 1310, for performing the above-described methods. For example, the non-transitory computer-readable storage medium may be a ROM, a RAM, a CD-ROM, a magnetic tape, a floppy disc, an optical data storage device or the like.

The non-transitory computer-readable storage medium has stored therein a plurality of programs for execution by a computing device having one or more processors, where the plurality of programs when executed by the one or more processors, cause the computing device to perform the above-described method for motion prediction.

In some embodiments, the computing environment 1310 may be implemented with one or more application-specific integrated circuits (ASICs), digital signal processors (DSPs), digital signal processing devices (DSPDs), programmable logic devices (PLDs), field-programmable gate arrays (FPGAs), graphical processing units (GPUs), controllers, micro-controllers, microprocessors, or other electronic components, for performing the above methods.

Figure 14:
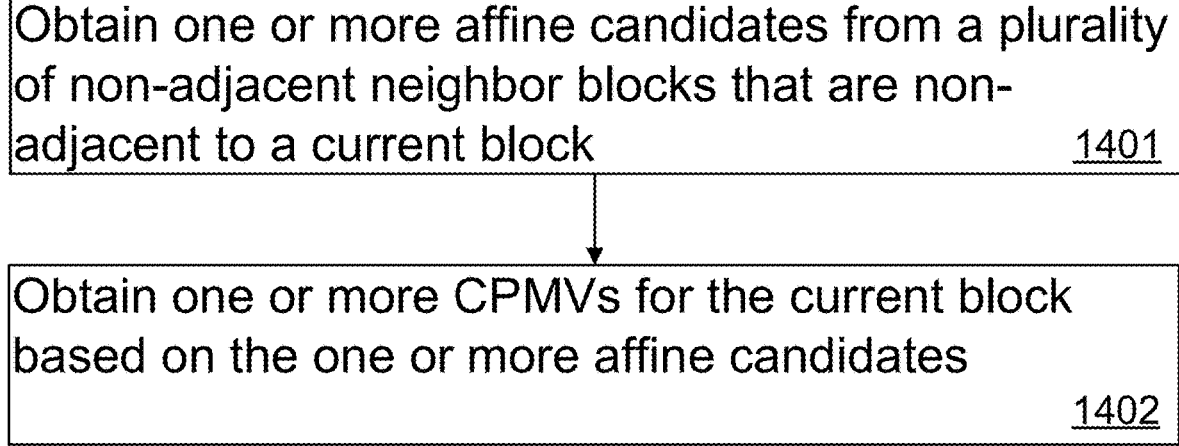
FIG. 14 is a flow chart illustrating a method for video coding in accordance with some examples of the present disclosure.

FIG. 14 is a flowchart illustrating a method for video coding according to an example of the present disclosure.

In step 1401, the processor 1320 may obtain one or more affine candidates from a plurality of non-adjacent neighbor blocks that are non-adjacent to a current block.

In step 1402, the processor 1320 may obtain one or more CPMVs for the current block based on the one or more affine candidates.

In some examples, the processor 1320 may obtain the one or more affine merge candidates according to a scanning rule.

In some examples, the scanning rule may be determined based on at least one scanning area, at least one scanning distance, and a scanning order.

In some examples, the at least one scanning distance indicates a number of blocks away from a side of the current block.

In some examples, the processor 1320 may further scan a plurality of non-adjacent neighbor blocks in a first scanning area to obtain one or more non-adjacent neighbor blocks coded with affine mode and determine the one or more non-adjacent neighbor blocks coded with affine mode as the one or more affine candidates. For example, the first scanning area may be the scanning area on the left of the current block as shown in FIG. 8. The first scanning area may be the scanning area above the current block as shown in FIG. 8 as well.

In some examples, the processor 1320 may stop scanning in the first scanning area in response to determining that a number of the one or more non-adjacent neighbor blocks coded with affine mode obtained reaches a predefined number, as a scanning termination.

In some examples, the processor 1320 may scan from a first starting non-adjacent neighbor block along a scanning line parallel with a left side of the current block, where the first starting non-adjacent neighbor block may be a bottom block in the first scanning area, and blocks in the first scanning area are at a first scanning distance away from the left side of the current block. For examples, the first starting non-adjacent neighbor block may be the bottom block in the left scanning area having distance 1, distance 2, or distance 3 as shown in FIG. 8.

In some examples, the first starting non-adjacent neighbor block may be on the bottom and the left of a second starting non-adjacent neighbor block in a second scanning area, and blocks in the second scanning area may be at a second scanning distance away from the left side of the current block. For examples, the first starting non-adjacent neighbor block may be the bottom block in the left scanning area having distance 2 and the first starting non-adjacent neighbor block may be on the bottom and the left of a starting non-adjacent neighbor block in the left scanning area having distance 1, as shown in FIG. 8.

In some examples, the processor 1320 may scan from a third starting non-adjacent neighbor block along a scanning line parallel with an upper side of the current block, where the third starting non-adjacent neighbor block may be a right block in the first scanning area, and blocks in the first scanning area may be at a first scanning distance away from the upper side of the current block. For examples, the third starting non-adjacent neighbor block may be the right block in the above or upper scanning area having distance 1, distance 2, or distance 3 as shown in FIG. 8.

In some examples, the third starting non-adjacent neighbor block may be on the top and the right of a fourth starting non-adjacent neighbor block in a second scanning area, and blocks in the second scanning area may be at a second scanning distance away from the upper side of the current block. For example, the third starting non-adjacent neighbor block may be on the right in the above or upper scanning area having distance 2 and the third starting non-adjacent neighbor block may be on the right of and above a starting non-adjacent neighbor block in the above or upper scanning area having distance 1, as shown in FIG. 8.

In some examples, the at least one scanning area may include at least one left scanning area that is on the left of the current block and at least one upper scanning area that is above the current block. The processor 1320 may scan a plurality of first non-adjacent neighbor blocks in the at least one left scanning area to obtain one or more first non-adjacent neighbor blocks coded with affine mode, scan a plurality of second non-adjacent neighbor blocks in the at least one upper scanning area to obtain one or more second non-adjacent neighbor blocks coded with affine mode and determine the one or more first non-adjacent neighbor blocks coded with affine mode and the one or more second non-adjacent neighbor blocks coded with affine mode as the one or more affine candidates.

In some examples, the at least one left scanning area may include a first left scanning area, a second left scanning area, and a third left scanning area. Furthermore, blocks in the first left scanning area may be at a first scanning distance away from a left side of the current block, blocks in the second left scanning area may be at a second scanning distance away from the left side of the current block, and blocks in the third left scanning area may be at a third scanning distance away from the left side of the current block. For example, the at least one left scanning area may include the left scanning area having distance 1, distance 2 and distance 3.

Moreover, the processor 1320 may scan the plurality of first non-adjacent neighbor blocks in the at least one left scanning area by: scanning from a first starting non-adjacent neighbor block along a first scanning line parallel with the left side of the current block, where the first starting non-adjacent neighbor block may be a bottom block in the first left scanning area; scanning from a second starting non-adjacent neighbor block along a second scanning line parallel with the left side of the current block, where the second starting non-adjacent neighbor block may be a bottom block in the second left scanning area; and scanning from a third starting non-adjacent neighbor block along a third scanning line parallel with the left side of the current block, where the third starting non-adjacent neighbor block may be a bottom block in the third left scanning area.

In some examples, the at least one upper scanning area may include a first upper scanning area, a second upper scanning area, and a third upper scanning area, where blocks in the first upper scanning area may be at a first scanning distance away from an upper side of the current block, blocks in the second upper scanning area may be at a second scanning distance away from the upper side of the current block, and blocks in the third upper scanning area may be at a third scanning distance away from the upper side of the current block. Furthermore, the processor 1320 may scan the plurality of second non-adjacent neighbor blocks in the at least one upper scanning area by: scanning from a fourth starting non-adjacent neighbor block along a fourth scanning line parallel with the upper side of the current block, where the fourth starting non-adjacent neighbor block may be a right block in the first upper scanning area; scanning from a fifth starting non-adjacent neighbor block along a fifth scanning line parallel with the upper side of the current block, where the fifth starting non-adjacent neighbor block may be a right block in the second upper scanning area; and scanning from a sixth starting non-adjacent neighbor block along a sixth scanning line parallel with the upper side of the current block, where the sixth starting non-adjacent neighbor block may be a right block in the third upper scanning area.

In some examples, the first scanning distance may be smaller than the second scanning distance, and the second scanning distance may be smaller than the third scanning distance.

In some examples, the processor 1320 may further obtain a first candidate position for a first affine candidate and a second candidate position for a second affine candidate based on a scanning rule, determine a third candidate position for a third affine candidate based on the first and second candidate position, obtain a virtual block based on the first candidate position, the second candidate position, and the third candidate position, obtain three CPMVs for the virtual block based on translational MVs at the first candidate position, the second candidate position, and the third candidate position, and obtain two or three CPMVs for the current block based on the three CPMVs of the virtual block by using a same projection process used for inherited candidate derivation.

In some examples, the virtual block may be a rectangular coding block and the third candidate position may be determined based on a vertical position of the first candidate position and a horizontal position of the second candidate position. For example, the virtual block may be the virtual block including positions A, B and C as shown in FIG. 9.

In some examples, the processor 1320 may determine the scanning rule based on at least one scanning area, at least one scanning direction, at least one scanning distance, and a scanning order.

In some examples, the processor 1320 may further obtain the first candidate position by scanning in a first scanning area along a first scanning direction perpendicular to an upper side of the current block at a first scanning distance, where the first scanning distance may include a first number of motion fields, a distance between the first candidate position and an adjacent motion field on the right of and above the upper side may be the first scanning distance, and the first scanning area may include a line of continuous motion fields on the right of and above the upper side. Moreover, the processor 1320 may obtain the second candidate position by scanning in a second scanning area along a second scanning direction perpendicular to a left side of the current block at a second scanning distance, where the second scanning distance may include a second number of motion fields, a distance between the second candidate position and an adjacent motion field on the left and bottom of the left side may be the second scanning distance, and the second scanning area may include a line of continuous motion fields on the left and bottom of the left side.

In some examples, the processor 1320 may scan in the first scanning area or in the second scanning area in a scanning order facing away from the current block.

In some examples, the processor 1320 may obtain the first candidate position by scanning in a third scanning area along a third scanning direction parallel to an upper side of the current block at a third scanning distance and may obtain the second candidate position by scanning in a fourth scanning area along a fourth scanning direction parallel to a left side of the current block at a fourth scanning distance.

In some examples, the processor 1320 may obtain the first candidate position by scanning in a fifth scanning area along a combination of a third scanning direction parallel to an upper side of the current block and a first scanning direction perpendicular to the upper side at a fifth scanning distance and may obtain the second candidate position by scanning in a sixth scanning area along a combination of a fourth scanning direction parallel to a left side of the current block and a second scanning direction perpendicular to the left side at a sixth scanning distance.

In some examples, the processor 1320 may scan in the fifth scanning area in a combined scanning order from left to right and facing away from the current block and scan in the sixth scanning area in a combined scanning order from top to down and facing away from the current block.

In some examples, the processor 1320 may stop scanning in the at least one scanning area in response to determining that a number of the one or more affine candidates reaches a predefined number.

In some examples, the processor 1320 may determine that the virtual block represents a 6-paramter affine model in response to determining that motion information of the first, second, and third affine candidates is available, may determine that the virtual block represents a 4-paramter affine model in response to determining that motion information of one of the first, second, and third affine candidates is unavailable, and may determine that virtual block is not capable of representing a valid affine model in response to determining that motion information of more than one of the first, second, and third affine candidates is unavailable.

FIG. 15 is a flowchart illustrating a method for pruning an affine candidate according to an example of the present disclosure.

In step 1501, the processor 1320 may calculate a first set of affine model parameters associated with one or more CPMVs of a first affine candidate.

In step 1502, the processor 1320 may calculate a second set of affine model parameters associated with one or more CPMVs of a second affine candidate.

In step 1503, the processor 1320 may perform a similarity check between the first affine candidate and the second affine candidate based on the first set of affine model parameters and the second set of affine model parameters.

In some examples, the processor 1320 may determine that the first affine candidate is similar to the second affine candidate and pruning one of the first affine candidate and second affine candidate in response to determining that the first set of affine model parameters are similar to the second set of affine model parameters.

In some examples, the processor 1320 may determine that the first affine candidate is similar to the second affine candidate in response to determining that a difference between one parameter of the first set of affine model parameters and one parameter of the second set of affine model parameters is smaller than a pre-defined threshold value.

In some examples, the processor 1320 may calculating, according to a width and a height of the current block, the first set of affine model parameters associated with the one or more CPMVs of the first affine candidate and may calculating, according to the width and the height of the current block, the second set of affine model parameters associated with the one or more CPMVs of the second affine candidate.

In some examples, different affine models are respectively applied to the first affine candidate and the second affine candidate, and the first set of affine model parameters and the second set of affine model parameters are respectively associated with the different affine models.

In some examples, the different affine models comprise a 4-parameter affine model and a 6-parameter affine model.

In some examples, there is provided an apparatus for video coding. The apparatus includes a processor 1320 and a memory 1340 configured to store instructions executable by the processor; where the processor, upon execution of the instructions, is configured to perform a method as illustrated in FIG. 14.

In some other examples, there is provided a non-transitory computer readable storage medium, having instructions stored therein. When the instructions are executed by a processor 1320, the instructions cause the processor to perform a method as illustrated in FIG. 14.

In some examples, there is provided an apparatus for video coding. The apparatus includes a processor 1320 and a memory 1340 configured to store instructions executable by the processor; where the processor, upon execution of the instructions, is configured to perform a method as illustrated in FIG. 15.

In some other examples, there is provided a non-transitory computer readable storage medium, having instructions stored therein. When the instructions are executed by a processor 1320, the instructions cause the processor to perform a method as illustrated in FIG. 15.

Other examples of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only.

It will be appreciated that the present disclosure is not limited to the exact examples described above and illustrated in the accompanying drawings, and that various modifications and changes can be made without departing from the scope thereof.

What is claimed is:

1. A method of video decoding, comprising:
obtaining one or more affine candidates from a plurality of non-adjacent neighbor blocks that are non-adjacent to a current block according to a scanning rule; and
obtaining one or more control point motion vectors (CPMVs) for the current block based on the one or more affine candidates,
wherein the method further comprises:
scanning a plurality of non-adjacent neighbor blocks in a first scanning area to obtain one or more non-adjacent neighbor blocks coded with affine mode;
determining the one or more non-adjacent neighbor blocks coded with affine mode as the one or more affine candidates; and
in response to determining that a number of the one or more non-adjacent neighbor blocks coded with affine mode obtained reaches a predefined number, stopping scanning in the first scanning area,
wherein the scanning rule is determined based on at least one scanning area, at least one scanning distance, and a scanning order, and the at least one scanning distance indicates a number of blocks away from a side of the current block.

2. The method of claim 1, further comprising:
scanning from a first starting non-adjacent neighbor block along a scanning line parallel with a left side of the current block, wherein the first starting non-adjacent neighbor block is a bottom block in the first scanning area, blocks in the first scanning area are at a first scanning distance away from the left side of the current block,
wherein the first starting non-adjacent neighbor block is on the bottom and the left of a second starting non-adjacent neighbor block in a second scanning area, blocks in the second scanning area are at a second scanning distance away from the left side of the current block.

3. The method of claim 1, further comprising:
scanning from a third starting non-adjacent neighbor block along a scanning line parallel with an upper side of the current block, wherein the third starting non-adjacent neighbor block is a right block in the first scanning area, blocks in the first scanning area are at a first scanning distance away from the upper side of the current block,
wherein the third starting non-adjacent block is on the top and the right of a fourth starting non-adjacent neighbor block in a second scanning area, blocks in the second scanning area are at a second scanning distance away from the upper side of the current block.

4. The method of claim 1, wherein the at least one scanning area comprises at least one left scanning area that is on the left of the current block and at least one upper scanning area that is above the current block;
the method further comprises:
scanning a plurality of first non-adjacent neighbor blocks in the at least one left scanning area to obtain one or more first non-adjacent neighbor blocks coded with affine mode;
scanning a plurality of second non-adjacent neighbor blocks in the at least one upper scanning area to obtain one or more second non-adjacent neighbor blocks coded with affine mode; and
determining the one or more first non-adjacent neighbor blocks coded with affine mode and the one or more second non-adjacent neighbor blocks coded with affine mode as the one or more affine candidates.

5. The method of claim 4, wherein the at least one left scanning area comprises a first left scanning area, a second left scanning area, and a third left scanning area,
wherein blocks in the first left scanning area are at a first scanning distance away from a left side of the current block, blocks in the second left scanning area are at a second scanning distance away from the left side of the current block, and
blocks in the third left scanning area are at a third scanning distance away from the left side of the current block, and
wherein scanning the plurality of first non-adjacent neighbor blocks in the at least one left scanning area comprises:
scanning from a first starting non-adjacent neighbor block along a first scanning line parallel with the left side of the current block, wherein the first starting non-adjacent neighbor block is a bottom block in the first left scanning area;
scanning from a second starting non-adjacent neighbor block along a second scanning line parallel with the left side of the current block, wherein the second starting non-adjacent neighbor block is a bottom block in the second left scanning area; and
scanning from a third starting non-adjacent neighbor block along a third scanning line parallel with the left side of the current block, wherein the third starting non-adjacent neighbor block is a bottom block in the third left scanning area.

6. The method of claim 5, wherein the at least one upper scanning area comprises a first upper scanning area, a second upper scanning area, and a third upper scanning area,
wherein blocks in the first upper scanning area are at a first scanning distance away from an upper side of the current block, blocks in the second upper scanning area are at a second scanning distance away from the upper side of the current block, and blocks in the third upper scanning area are at a third scanning distance away from the upper side of the current block, and
wherein scanning the plurality of second non-adjacent neighbor blocks in the at least one upper scanning area comprises:
scanning from a fourth starting non-adjacent neighbor block along a fourth scanning line parallel with the upper side of the current block, wherein the fourth starting non-adjacent neighbor block is a right block in the first upper scanning area;
scanning from a fifth starting non-adjacent neighbor block along a fifth scanning line parallel with the upper side of the current block, wherein the fifth starting non-adjacent neighbor block is a right block in the second upper scanning area; and scanning from a sixth starting non-adjacent neighbor block along a sixth scanning line parallel with the upper side of the current block, wherein the sixth starting non-adjacent neighbor block is a right block in the third upper scanning area, wherein the first scanning distance is smaller than the second distance, and the second scanning distance is smaller than the third scanning distance.

7. The method of claim 1, further comprising:

obtaining a first candidate position for a first affine candidate and a second candidate position for a second affine candidate based on a scanning rule;

determining a third candidate position for a third affine candidate based on the first and second candidate positions for the third affine candidate;

obtaining a virtual block based on the first candidate position, the second candidate position, and the third candidate position;

obtaining three CPMVs for the virtual block based on translational motion vectors (MVs) at the first candidate position, the second candidate position, and the third candidate position; and obtaining two or three CPMVs for the current block based on the three CPMVs of the virtual block by using a same projection process configured for inherited candidate derivation, wherein the virtual block is a rectangular coding block and the third candidate position is determined based on a vertical position of the first candidate position and a horizontal position of the second candidate position, wherein the scanning rule is determined based on at least one scanning area, at least one scanning direction, at least one scanning distance, and a scanning order.

8. The method of claim 7, further comprising:

obtaining the first candidate position by scanning in a first scanning area along a first scanning direction perpendicular to an upper side of the current block at a first scanning distance, wherein the first scanning distance comprises a first number of motion fields, a distance between the first candidate position and an adjacent motion field on the right of and above the upper side is the first scanning distance, and the first scanning area comprises a line of continuous motion fields on the right of and above the upper side; and obtaining the second candidate position by scanning in a second scanning area along a second scanning direction perpendicular to a left side of the current block at a second scanning distance, wherein the second scanning distance comprises a second number of motion fields, a distance between the second candidate position and an adjacent motion field on the left and bottom of the left side is the second scanning distance, and the second scanning area comprises a line of continuous motion fields on the left and bottom of the left side.

9. The method of claim 8, further comprising:

scanning in the first scanning area or in the second scanning area in a scanning order facing away from the current block.

10. The method of claim 7, further comprising:

obtaining the first candidate position by scanning in a third scanning area along a third scanning direction parallel to an upper side of the current block at a third scanning distance; and obtaining the second candidate position by scanning in a fourth scanning area along a fourth scanning direction parallel to a left side of the current block at a fourth scanning distance.

11. The method of claim 10, further comprising:

scanning in the third scanning area in a scanning order from left to right; and scanning in the fourth scanning area in a scanning order from top to down.

12. The method of claim 7, further comprising:

obtaining the first candidate position by scanning in a fifth scanning area along a combination of a third scanning direction parallel to an upper side of the current block and a first scanning direction perpendicular to the upper side at a fifth scanning distance;

obtaining the second candidate position by scanning in a sixth scanning area along a combination of a fourth scanning direction parallel to a left side of the current block and a second scanning direction perpendicular to the left side at a sixth scanning distance.

13. The method of claim 12, further comprising:

scanning in the fifth scanning area in a combined scanning order from left to right and facing away from the current block; and scanning in the sixth scanning area in a combined scanning order from top to down and facing away from the current block.

14. The method of claim 7, further comprising:

in response to determining that a number of the one or more affine candidates reaches a predefined number, stopping scanning in the at least one scanning area.

15. The method of claim 7, further comprising:

in response to determining that motion information of the first, second, and third affine candidates is available, determining that the virtual block represents a 6-parameter affine model;

in response to determining that motion information of one of the first, second, and third affine candidates is unavailable, determining that the virtual block represents a 4-parameter affine model; and in response to determining that motion information of more than one of the first, second, and third affine candidates is unavailable, determining that the virtual block is not capable of representing a valid affine model.

16. An apparatus for video coding, comprising:

one or more processors; and a memory coupled to the one or more processors and configured to store instructions executable by the one or more processors, wherein the one or more processors, upon execution of the instructions, are configured to perform operations comprising:

obtaining one or more affine candidates from a plurality of non-adjacent neighbor blocks that are non-adjacent to a current block by scanning the plurality of non-adjacent neighbor blocks in at least one scanning area according to a scanning rule; and obtaining one or more control point motion vectors (CPMVs) for the current block based on the one or more affine candidates, wherein the operations further comprise:

scanning a plurality of non-adjacent neighbor blocks in a first scanning area to obtain one or more non-adjacent neighbor blocks coded with affine mode;

determining the one or more non-adjacent neighbor blocks coded with affine mode as the one or more affine candidates; and in response to determining that a number of the one or more non-adjacent neighbor blocks coded with affine mode obtained reaches a predefined number, stopping scanning in the first scanning area, wherein the at least one scanning area consists of at least one line of continuous blocks, the scanning rule is determined based on at least one scanning area, at least one scanning distance, and a scanning order, and the at least one scanning distance indicates a number of blocks away from a side of the current block.

17. A non-transitory computer-readable storage medium storing a bitstream and executable instructions that when executed by one or more processors, cause the one or more processors to perform operations comprising:

obtaining one or more affine candidates from a plurality of non-adjacent neighbor blocks that are non-adjacent to a current block by scanning the plurality of non-adjacent neighbor blocks in at least one scanning area according to a scanning rule; and obtaining one or more control point motion vectors (CPMVs) for the current block based on the one or more affine candidates, wherein the operations further comprise:

scanning a plurality of non-adjacent neighbor blocks in a first scanning area to obtain one or more non-adjacent neighbor blocks coded with affine mode;

determining the one or more non-adjacent neighbor blocks coded with affine mode as the one or more affine candidates; and in response to determining that a number of the one or more non-adjacent neighbor blocks coded with affine mode obtained reaches a predefined number, stopping scanning in the first scanning area, wherein the at least one scanning area consists of at least one line of continuous blocks, the scanning rule is determined based on at least one scanning area, at least one scanning distance, and a scanning order, and the at least one scanning distance indicates a number of blocks away from a side of the current block.

18. The apparatus of claim 16, wherein the operations further comprise:

scanning from a first starting non-adjacent neighbor block along a scanning line parallel with a left side of the current block, wherein the first starting non-adjacent neighbor block is a bottom block in the first scanning area, blocks in the first scanning area are at a first scanning distance away from the left side of the current block, wherein the first starting non-adjacent neighbor block is on the bottom and the left of a second starting non-adjacent neighbor block in a second scanning area, blocks in the second scanning area are at a second scanning distance away from the left side of the current block.

19. The apparatus of claim 16, wherein the operations further comprise:

scanning from a third starting non-adjacent neighbor block along a scanning line parallel with an upper side of the current block, wherein the third starting non-adjacent neighbor block is a right block in the first scanning area, blocks in the first scanning area are at a first scanning distance away from the upper side of the current block, wherein the third starting non-adjacent block is on the top and the right of a fourth starting non-adjacent neighbor block in a second scanning area, blocks in the second scanning area are at a second scanning distance away from the upper side of the current block.

20. The apparatus of claim 16, wherein the at least one scanning area comprises at least one left scanning area that is on the left of the current block and at least one upper scanning area that is above the current block;

the operations further comprise:

scanning a plurality of first non-adjacent neighbor blocks in the at least one left scanning area to obtain one or more first non-adjacent neighbor blocks coded with affine mode;

scanning a plurality of second non-adjacent neighbor blocks in the at least one upper scanning area to obtain one or more second non-adjacent neighbor blocks coded with affine mode; and determining the one or more first non-adjacent neighbor blocks coded with affine mode and the one or more second non-adjacent neighbor blocks coded with affine mode as the one or more affine candidates.

* * * * *